United States Patent [19]

Urruela

[11] 4,264,145

[45] Apr. 28, 1981

[54] INVERTIBLE APPARATUS FOR THE REFLECTION OF SOLAR RADIATION

[75] Inventor: José R. Urruela, Bilbao, Spain

[73] Assignee: Sener, Ingenieria Y Sistemas, S.A., Madrid, Spain

[21] Appl. No.: 74,294

[22] Filed: Sep. 11, 1979

[30] Foreign Application Priority Data

Sep. 14, 1978 [ES] Spain ..................................... 473.355
Sep. 14, 1978 [ES] Spain ..................................... 473.356

[51] Int. Cl.³ .............................................. G02B 7/18
[52] U.S. Cl. .................................... 350/296; 350/299; 350/320; 248/487
[58] Field of Search ............... 350/296, 293, 292, 289, 350/299, 320; 353/3; 126/438; 248/487

[56] References Cited

U.S. PATENT DOCUMENTS

| 4,063,543 | 12/1977 | Hedger ..................................... 353/3 |
| 4,122,827 | 10/1978 | Rhodes ..................................... 353/3 |
| 4,178,913 | 12/1979 | Hutchison ............................ 350/293 |

FOREIGN PATENT DOCUMENTS

156172  7/1932  Switzerland ................................. 353/3

*Primary Examiner*—Jon W. Henry
*Attorney, Agent, or Firm*—Mason, Kolehmainen, Rathburn & Wyss

[57] ABSTRACT

Apparatus for reflecting light including a head carrying a reflecting panel and mounted for rotation on a column, said head including a mechanism for rotating said panel about a horizontal axis between a first range of positions for following the sun and an inverted position, said mechanism including an articulated quadrilateral controlled by a linear actuator.

9 Claims, 13 Drawing Figures

INVERTIBLE APPARATUS FOR THE REFLECTION OF SOLAR RADIATION

FIELD OF THE INVENTION

The present invention relates to improvements in heliostats these being apparatus designed to receive solar radiation and reflect it towards a determined point, for which purpose they are provided with a mechanism for following the sun, which provides for suitable orientation at any particular moment in order to obtain the maximum receptive capacity, and as a consequence, maximum reflection of the solar radiation.

BACKGROUND OF THE INVENTION

The interest which has recently been shown in using solar radiation as an industrial source of energy is very well known indeed. It is not unreasonable to affirm that at present the main problems have already been resolved in the design of an electrical energy generating plant making use of energy radiated by the sun in order to heat one or more fluids, to produce vapor and to then drive a turbo alternator. The investment costs involved with the provision of a heliothermic generating plant are also known.

A very large part of this investment is tied up with the provision of heliostats arranged over a large area. These pieces of apparatus, which are fixed to the ground, receive solar energy and reflect it onto a receiver, which heats up a fluid.

Various types of heliostats do exist of which one is the so-called momopode.

This apparatus consists of a leg or column, on the plane top of which a head revolves which houses the revolving mechanism, which is also referred to as the azimuth mechanism. The head has fixed to it, in a manner which allows for rotation, a supporting structure for one or more panels of reflecting mirror; and which, furthermore, is provided with its own mechanism, referred to as the elevating mechanism, which provides for the above described rotary motions. The revolving mechanism for the head operates about the vertical axis of the column; whilst the elevating mechanism of the supporting structure for the reflecting panels operates about a horizontal axis, which is normal to the vertical axis referred to.

A large area array of heliostats, comprising many thousands of heliostats, is exposed to the direct action of natural ecological factors, these being: direct solar radiation, temperature changes; rain, wind, hail, and the like.

The task of an elevating mechanism is not limited to that of following the sun, this of course being an extremely important task, but furthermore it must position the reflecting panels horizontally, with the mirrors directed downwardly, in order to protect them in the case of a hail storm.

It is also necessary for them to take up this position in order to provide the greatest margin of security when they are subject to the direct action of strong winds, of hurricane force; although in this case it is possible for the mirrors to remain with their surfaces directed upwardly.

Since the investment costs involved with a large area array of heliostats may constitute something of the order of fifty percent of the total investment costs of the generating station, it is of prime importance not only to bring these costs down, but also to reduce as much as possible expenses for maintenance and upkeep. It is consequently vital to provide not only standardized large scale production of the various components of heliostats; but also to employ a reduced number of these as well as providing the possibility of carrying out the maximum number of operations using one individual machine tool and, clearly, as well, it is necessary to eliminate on-site assembly operations as much as possible by providing the maximum number of pre-assembled parts to be delivered in units to the site. It is also important to provide an operating mechanism which uses a reduced number of parts, and these should be as simple as possible: this being done in order to reduce maintenance and upkeep costs so that each heliostat is as durable as possible.

In order to provide a heliostat with a long working life, and in the case of present day projects this is expected to be not less than thirty years, the heliostat must be designed to withstand any occurence which might reasonably be expected. For example it must withstand the direct action of a hurricane. In order to withstand the effects of a hurricane, the heliostats must be arranged so that their panels are in a horizontal position, but should one of them not comply with the order, as a result of a breakdown, it would put the whole of the large area array of heliostats in grave danger since should one of these or a part of one be torn from its mountings, the wind could use it as a projectile against the others.

Nevertheless, the designing of heliostats in order that they can withstand the action of hurricanes, when their maximum surface is exposed to these, is an expensive solution.

From another point of view, the energy yields, and the economic gain, from a heliostat generating plant depends essentially on the degree of precision of the focusing of the panels of mirrors on the receptor. In the case of projects which are actually being worked on there is a requirement with all designs that the focusing error of a heliostat should not be greater than two milliradians. It should be born in mind that only the best structural foundations of the supporting columns can provide a figure which is on the order of one milliradian. Furthermore, the inevitable yielding of every supporting structure is present, the structure consisting for example of the column itself, the structure which carries the reflecting panels in an overhanging manner, which themselves act as plates which are supported at three of four points. For this reason, it is just as important to reduce, as much as is possible, play in the mechanism, by using parts which are more suitable and reducing the number of individual components comprising these.

Additionally, in order to achieve the necessary thirty years working life it is necessary to adopt, on the one hand, mechanisms which are subject to the least possible wear, using larger surface contact areas, and reduced contact pressures; and on the other hand to reduce to a minimum, or even to avoid, all types of residual stress which decreases the stress resistance of the materials used.

The reduction of residual stresses is vital for the survival of a mirror, the limits of endurance of which are per se somewhat low. It is very important to avoid tractional forces on a mirror. Generally these result either from the technological processes used in shaping the mirror, or from thermal effects, since the reflecting panel is made up of materials having very differing coefficients of thermal expansion.

For all these reasons, in the case of the best present day designs of heliostats, the use of curved mirrors has been dropped, and this has given way to the use of plane panels, to the detriment of the energy yield of the generating unit. In this same connection, this indicates that the use of aluminum should also be dropped, this being a material having a high coefficient of expansion, for the support for the mirrors.

However, when attempts have been made to obtain concave surfaces, using support materials such as foam of various plastics, polyester or polyurethane, using machining of these, it has not been possible to obtain a geometry which meets the necessary tolerance requirements. This is another of the reasons which made it necessary, in the case of the designs referred to, to drop the use of curved mirrors. Designs in which the forced deformation of the mirror was decided upon as a solution, either using threaded tensioners or using the permanent action of a vacuum, have met with failure because the concave geometry was obtained by introducing tractional stresses, bending stresses and membrane stresses which sharply reduce the fatigue resistance of the mirror.

Finally, it should be pointed out that the energy yield from a heliostat generating plant is very closely tied up with the consumption of energy used by the heliostat for operating their mechanisms which follow the sun. In its turn, the power of the mechanisms referred to is a direct function of the lever arm of the couple providing the turning force: the larger the arm, the lesser the power, for the same turning moment.

As has already been said, the elevating mechanism should be able to provide for the reflecting panels to turn through half a turn of 180°. In present day designs, this is obtained by means of the rotation of a tube which is the principle component of the supporting structure for the reflecting panels, and which rests onto two large diameter bearings which surround it and allow it to rotate. Rotation of the above said tube is obtained, either using a gear wheel, which is rigidly fixed to the tube, and a reduction gear associated with the motor providing elevation; or is obtained using two linear actuators, one of which together with the tube referred to and an additional lever which pivots on the same bearing as the tube, constitutes a triangle having a variable configuration. Both solutions, in addition to requiring expensive bearings of large diameter or a combination of equivalent swivel joints, suffer from the disadvantage of having short lever arms which require a greater power.

SUMMARY OF THE INVENTION

One of the objects of the present invention is actually to avoid the use of these large bearings, these being substituted by simply sliding bearings; but, mainly is to provide a lever arm which is as long as desired, and, consequently, which requires less power. To achieve this, in accordance with the invention, rotary motion of the tube carrying the reflecting panel is no longer used and this is substituted by using a tilting motion.

According to the present invention the elevating mechanism is made up by an articulated quadrilateral which makes it possible to provide the half turn of 180° using one single actuator.

In this manner, the investment costs are reduced enormously as are maintenance costs, thanks to the provision of a more rigid unit. This latter characteristic contributes in improving the focusing of the heliostat, and consequently the energy yield. In the same way it provides for the large bearings to be substituted by sliding joints having a low degree of wear. This property is improved by making use of a linear actuator, which is articulated on two swivel joints which are similar to the ones referred to, the actuator for which comprises two rolling nuts, which are pretensioned with respect to each other in order to eliminate play between the elements of these nuts and the sides of the threads of the central spindle. For the same reason, in order to improve the focusing of the heliostat, by reducing play between the mechanical parts, in the case of the azimuth mechanism, a harmonic reducing gear has been adopted using a high number of teeth which are engaged simultaneously and having minimal play between the teeth referred to.

Reference has already been made to the danger which could be created when even only one of the heliostats receives the full force of a hurricane wind against its maximum surface area. If it is desired that heliostats are able to withstand this action, high investment costs are needed. In the present invention, each of the mechanisms has been provided with torque limiters, which once set up to the couple which is produced by wind of a certain strength which is very much less than that of hurricane force, put the structure carrying the panels in the required position where the least surface is exposed to the wind.

Obviously the above said torque limiters could be reduced to one single one, either in the elevating mechanisms or in the azimuth mechanism. It is also possible to use various types of torque limiters, such as those using cones, discs, spring action, electromagnetic action, and the like.

At the same time, the present invention removes the arbitrary nature of the geometrical surface, which is a problem and is a result of the machining of the semi-rigid slab of foam which will act as a support for the mirrors. Also the danger resulting from residual stresses as a result of the forced deformation of the mirror, which was originally plane, has been eliminated.

In accordance with the invention, in order to obtain the panels, a mold or bed is first fabricated which has a convex surface having a curvature which is equal to the concavity which it is desired to obtain for the reflecting panel. The plane mirror of reduced thickness is arranged over this surface, so that it adapts itself, at least over the major portion of its extension to the convex surface of the mold due to the actual weight of the mirror. Then, over the convex back surface of the mirror which has been fitted over the mold or bed, a slab of low density semi-rigid material is arranged which, in the same way as for the mirror, will take up a position, due to its own weight and over practically the whole of its extension, over the said mirror, the said slab adhering to the said mirror.

Subsequently, the upper convex part of the slab is removed until a plane is obtained which is perpendicular to the normal central axis of symmetry of the convex surface of the mold, the said plane being situated at such a height that a plane surface is obtained which is limited by the four lateral faces of the said slab. A sheet is adhered over this plane surface, and this will be rigidified at least in one direction in order to guarantee and maintain the concave shaping of the panel, once it has been removed from the mold.

The matching up of the mirror over the convex surface of the mold or bed may not be complete, the periphery not adapting itself to the said mold or bed. In this case, slight pressure is applied to the points close to the periphery of the mirror and this pressure is sufficient to provide complete matching up of the mirror to the surface of the mold but without in practice introducing stresses into the said mirror.

The same thing may happen with the semi-rigid material, the periphery of which does not adapt itself to the convex external surface of the mirror. In this case as well, slight pressure will be applied, which is sufficient in order to obtain complete matching up to the convex surface of the mirror, but, as before, without in practice introducing stresses into the said material.

The outer plate of the panel can be rigidified using external profiled parts or even using corrugations or ribs formed in the plate itself.

The convex surface of the mold or bed may be cylindrical, the rigidifying arrangement for the plate being in this case arranged in a direction which is normal to the axis of the cylinder.

Using the method described above, the surface of the semi-rigid material which is directed towards the mirror is not worked. This surface remains in tact and smooth, and is in the best possible condition for receiving the adhesive and being joined to the mirror, without introducing stresses into the mirror.

The concave geometry of the mirror and of the slab of semi-rigid material is obtained without in practice introducing stresses into these, since the radius of curvature needed is very large and the mirror is of reduced thickness.

According to the present invention, and as have already been said, the operating mechanism for the structure carrying the panels is made up one single mechanical linear actuator, the housing of which is suspended in an articulated manner on the revolving head, whilst the extendible element of the actuator is connected at its free end to the vertex of an articulated quadrilateral, the sides of which are of constant length.

One of the sides of this quadrilateral is defined by the revolving head of the heliostat itself. The sides adjacent to the head are defined by an upper lever, which carries the structure of the mirrors, and by a lower lever which passes between the said head and the vertex to which the actuator is articulated. Finally, the fourth side is made up by an arm which passes between the vertex, to which the actuator is articulated, and the free end of the upper lever.

The degree of extension of the actuator will be such that, from its limiting retracted position up to its position of maximum extension, the said upper lever is able to turn at least through 180°, about the point of articulation with the revolving head.

In order to obtain the maximum effect, the separate reflecting panels of a heliostat are arranged with respect to each other in such a way that the mirrors are tangential to a spherical or cylindrical surface, with an axis parallel to the plane of rotation of the revolving head.

As has already been indicated, the mechanical actuator consists of a spindle on which two mutually pre-tensioned nuts are mounted, to which a tubular profile is fixed which surrounds the said spindle and constitutes the displaceable elements of the actuator. The tubular profiled part is articulated at its free end to the above said vertex of the articulated parallelogram, the spindle and the tubular profiled part referred to above being housed in a casing, in which the above said profiled part is able to slide and the shaft rotate.

The back plate of the reflecting panels is rigidified in one sense, the rigidifying elements being made up by ribs, corrugations or even shaped parts which are welded to the outer surface of the plate.

In the case where the mirrors are cylindrical, with an axis which is normal to the axis of the cylindrical surface to which the said mirrors are tangential, the rigidifying elements for the plate will pass in a sense which is perpendicular to the axis of the cylinder defined by the mirror.

All the characteristics which have been referred to, in addition to further ones which constitute parts of the invention, will be better understood from the following description which is provided with reference to the attached drawings, in which one preferred embodiment is shown diagrammatically, these being:

DETAILED DESCRIPTION OF A PREFERRED EMBODIMENT

Figure 1:
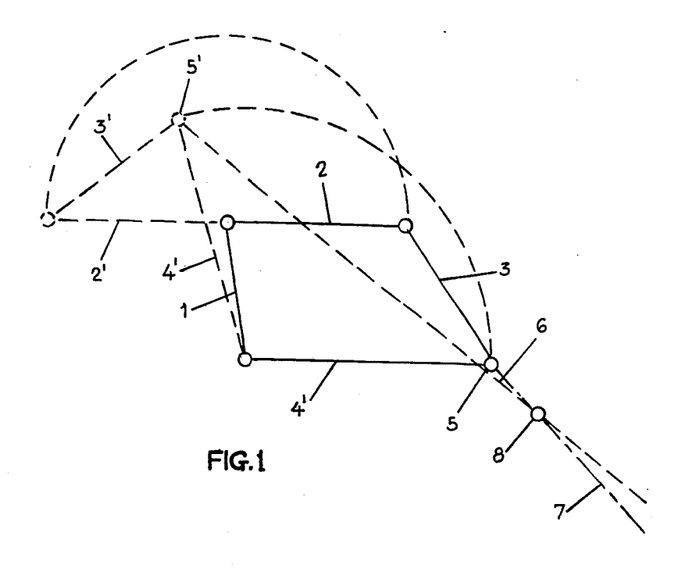
FIG. 1 shows the layout of the articulated quadrilateral which makes up the elevating mechanism.

With reference to FIG. 1, the sides of the articulated quadrilateral, which have a constant length, are indicated by reference numerals 1, 2, 3, 4, side 1 corresponding to the revolving head of the heliostat to which arms 2 are articulated, which are made up by an upper lever carrying the structure for carrying the panels and a lower lever 4. The fourth arm, which has the reference numeral 3 is articulated at one end on the upper lever 2 and at the other end on the lower lever 4 of the quadrilateral. The articulations are defined by swivel joints having low play. The actuator 6 is connected in a pivoting manner to the vertex 5, at the point where arm and the lower lever 4 are articulated, the casing 7 of the actuator being suspended in an articulated manner from a fixed point 8 provided on the revolving head.

The continuous lines show the position of the articulared quadrilateral when the actuator is at the limit of its withdrawn position. When the actuator is extended to its maximum extended position, the quadrilateral becomes deformed and passes to the position shown in dashed lines, the side 1 remaining in a constant position, as this corresponds to the revolving head, whilst the side 2, which corresponds to the upper lever, now takes up the position indicated by reference numeral 2', the arm 3 takes up the position referred to with reference numeral 3', side 4 corresponding to the lower lever takes up the position referred to with reference numeral 4' and the vertex 5 takes up the position referred to with reference numeral 5'.

From the position shown using continuous lines to the position shown in dashed lines, side 2, which corresponds to the upper lever to which the structure carrying the reflecting panels is rigidly fixed, has passed through an angle of 180°, as a result of which if, in the position shown by means of continuous lines the panels were in the horizontal position with the reflecting surface directed upwardly, in the position shown using dashed lines the reflecting surface of the panels, which will be fixed by means of the supporting structure to side 2', will now be in the horizontal position but inverted.

Figure 2:
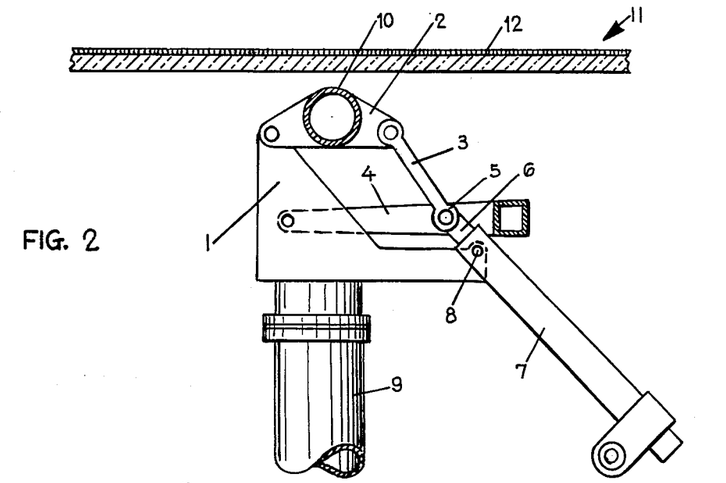
FIG. 2 is a diagrammatical side view of the elevating mechanism in a position which corresponds to the maximum retraction of the actuator.

FIG. 2 shows diagrammatically the upper part of the heliostat taking up the position shown in continuous lines of the articulated quadrilateral in FIG. 1.

The heliostat comprises a support column 9 on the top of which the revolving head 1 is mounted in a horizontal plane. The revolving head 1 has the lever 2 connected to it at its upper portion in an articulated manner and this is rigidly fixed to the structure 10 which carries the reflecting panels. The lower lever 4 is also articulated on head 1 and the upper lever 2 is articulated between the lower lever 4 and the upper lever 2. At the point of articulation 5 between this arm 3 and the lower lever 4, the extendable element 6 of the actuator is articulated, the casing 7 of which is suspended in an articulated manner from the revolving head 1 by means of a swivel joint 8 having a low degree of play.

In the position shown in FIG. 2, the reflecting panel, which generally is referred to by reference numeral 11, will be located with the reflecting mirror 12 arranged horizontally and directed upwardly.

Figure 3:
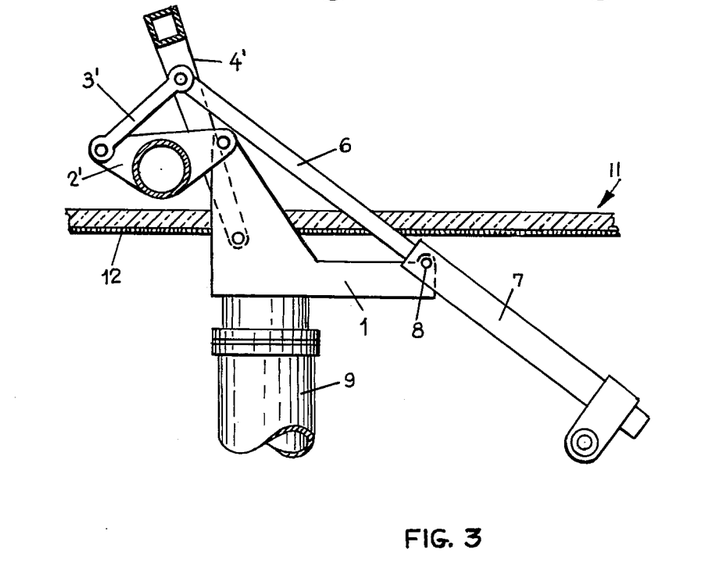
FIG. 3 is a view which is similar to FIG. 2, in which the elevating mechanism has taken up a position which corresponds to the maximum extension of the actuator.
Figure 4:
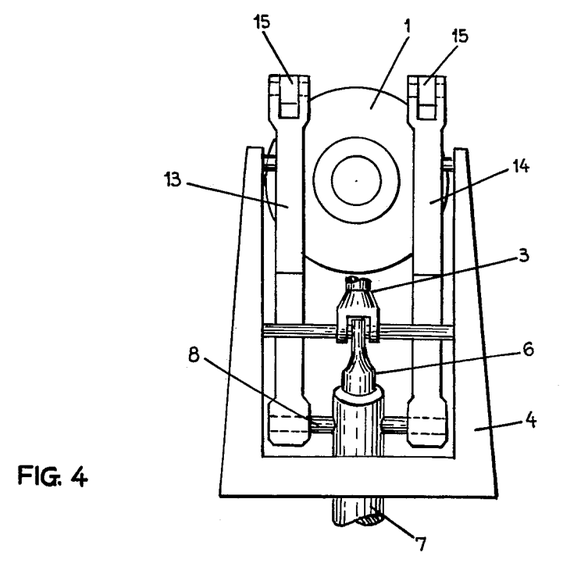
FIG. 4 is a partial plan view of the elevating mechanism in the position shown in FIG. 2, in which the upper lever and the structure which carries the panels has been eliminated.

FIG. 3 shows the extendable element 6 of the actuator in its position of maximum extension, and as a result of this the upper lever 2 comes to occupy the position 2' whilst the arm 3 and the lower lever 4 take up, respectively, the positions indicated by reference numeral 3' and 4'; the casing 7 of the actuator will have pivoted about the point of articulation 8. Since lever 8 has turned through 180°, the panels 11 are now in a horizontal position but with the reflecting mirror 21 in the inverted position. The head 1, as will be seen in FIG. 4, may have parallel lugs 13 and 14 which are formed at one of their ends so as to each have a forked pivoting arrangement 15 for the upper lever. At their other ends these lugs are provided with journals for receiving swivel joints having a low degree of play by mans of which the casing 7 of the actuator is pivoted. The extendable element 6 of the actuator is articulated on arm 3 and the lower lever 4 which embraces the whole unit.

Figure 5:
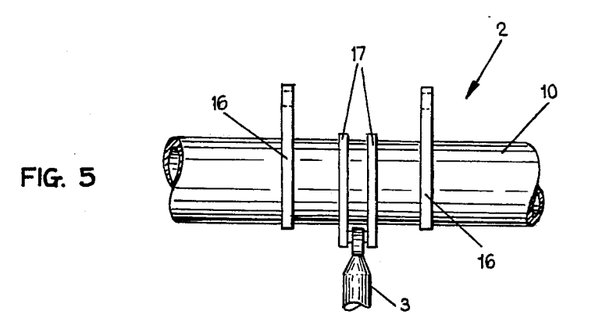
FIG. 5 is a partial plan view of the upper lever and the structure for supporting the panels, as they would be located in FIG. 4.

As can be seen in FIG. 5, the upper lever 2 may be made up by a pair of outer plates 16 and a pair of inner plates 17, all of which are rigidly fixed to the structure 10 which carries the reflecting panels and which are arranged in such a way that the said pairs of plates project at diametrically opposed positions to provide for articulation in the forked arrangement 15, in the case of the outer plates 16, and for receiving the end of arm 3 which articulates on the inner plates 17.

Using the construction described, it is possible by only using one actuator, and by means of the arrangement of elements which make up the articulated quadrilateral, to pass from a position in which the reflecting panel is in a position which is substantially horizontal, with the mirror directed upwardly, to a further position in which it also has a position which is substantially horizontal but the mirror is directed downwardly.

Figure 6:
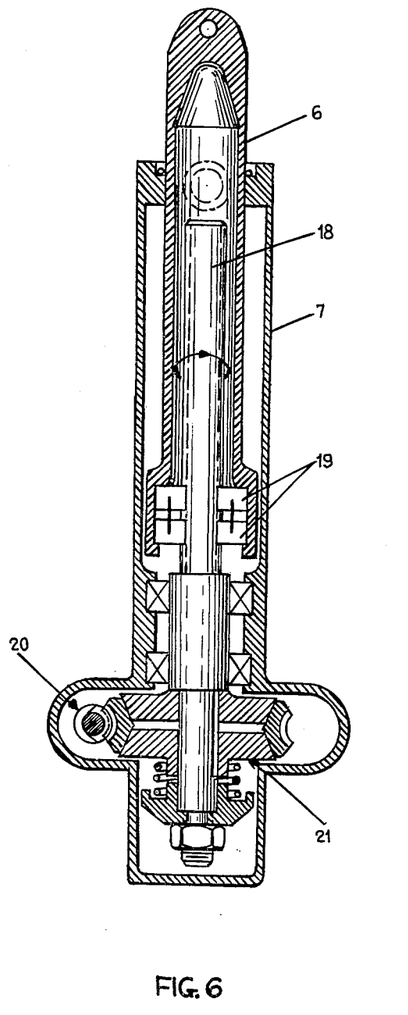
FIG. 6 is a diagrammatical cross-section of the actuator.

FIG. 6 shows a cross-sectional view of the actuator, which is made up by a spindle 18 on which two rolling nuts 19 which are pre-tensioned with respect to each other are mounted, so that play between the nuts and the edges of the thread of spindle 18 is avoided and friction is reduced. The extendable element 6 is mounted above the nuts 19, and element 6 is made up by a tube the external end of which articulates on arm 3 of the articulated quadrilateral.

The whole assembly is mounted inside a casing 7 in the lower portion of which the reducing mechanism 20 is mounted as well as a torque limiter 21.

Figure 7:
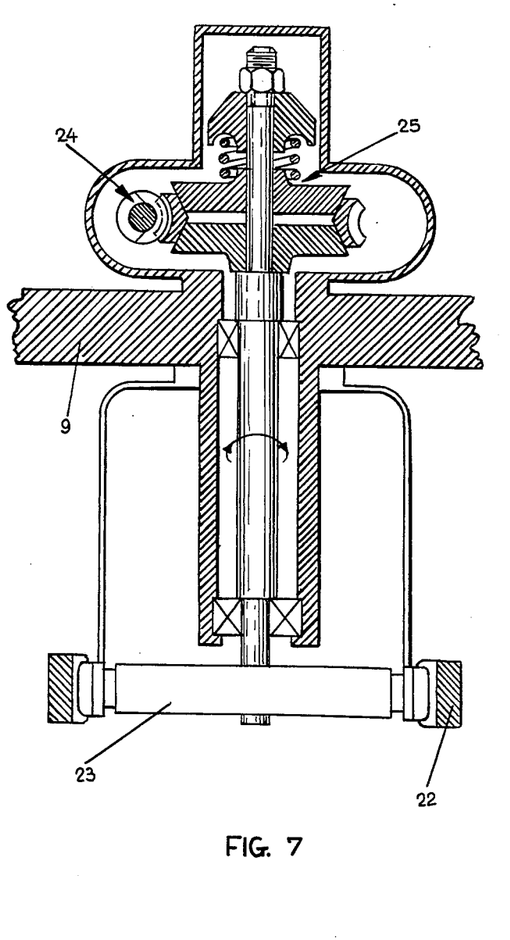
FIG. 7 is a diametrical cross-section of the azimuth mechanism.

Concerning the azimuth mechanism, shown in FIG. 7, this comprises a crown 22, which is fixed to the column 9 of the heliostat, and the harmonic reducing gear 23 engages with crown 22 by means of a high number of teeth, which makes it possible to reduce play between the teeth of both elements. The azimuth mechanism, in addition to being provided with the corresponding reducing gear 24, is provided, in a similar manner to the case above, with a torque limiter 25.

The torque limiters 21 and 25 are adjusted to a value corresponding to the torque produced by a predetermined wind speed the force of which is well below that of a hurricane, so that when the wind speed exceeds the set value, the supporting structure 10 for the reflecting panels will take up a position in which the surface which is exposed to the wind is at a minimum.

The elevating mechanisms can be reduced to only one, either in the case of the elevating mechanisms in FIG. 6, or in the case of the azimuth mechanism in FIG. 7. Also, as has already been said above, the torque limiter(s) may be of any known type.

The mechanisms which have been described do offer a high degree of simplicity with respect to the mechanisms used for conventional heliostats, as well as greater accuracy in the orientation of the reflecting panels, all of which result in greater economy and efficiency of the heliostat according to the invention.

Figure 8:
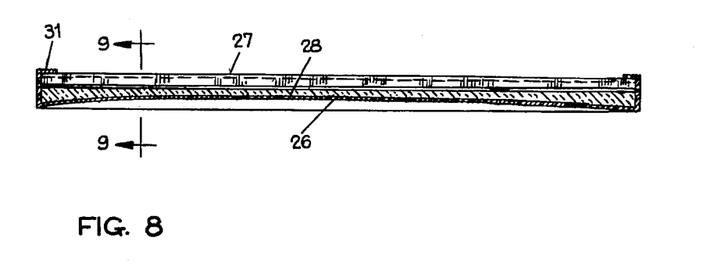
FIG. 8 is a longitudinal cross-section of one of the panels.
Figure 9:
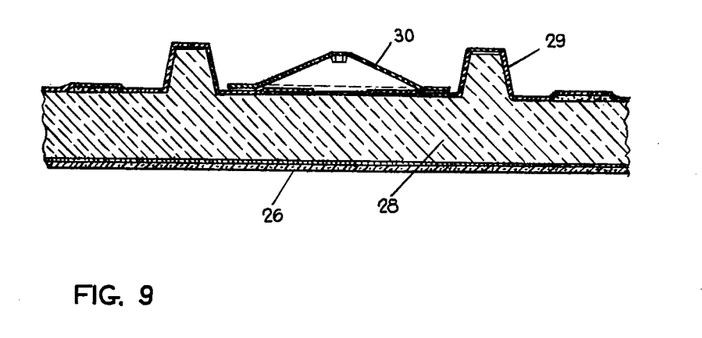
FIG. 9 is a partial cross-section, on an enlarged scale, taken along line IX—IX of FIG. 8.

The reflecting panels used in the heliostat according to the invention are made up, as can be seen in FIGS. 8 and 9, by a concave mirror 26, provided with at least one curvature, and a support which is made up by a corrugated or ribbed sheet 27 and an intermediate filling 28 having reduced weight.

Figure 10:
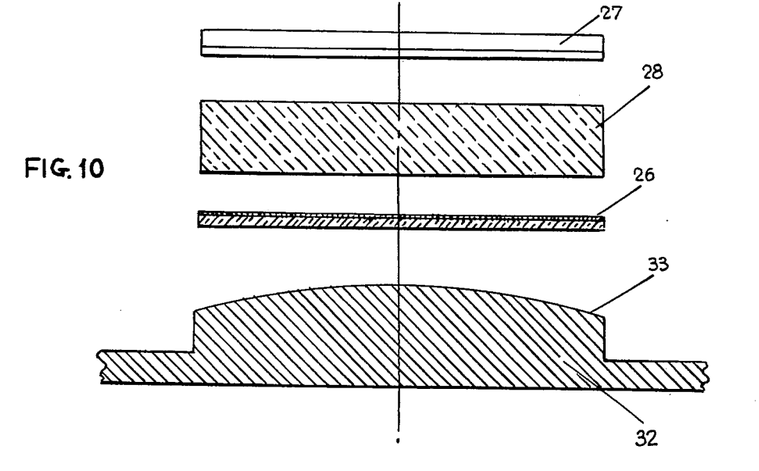
FIG. 10 is a cross-section of the various parts, having their original shape, which are used in the process according to the invention for obtaining the panels.

As can be seen in FIG. 10, in order to prepare the panel, a mold or bed 32 is prepared which has a convex surface 33 the curvature of which is equal to the concavity which it is desired to provide the reflecting panel with. The part used for obtaining the panel comprise a plane mirror 26 of reduced thickness, a semi-rigid slab 28 of low density which acts as a filling and a sheet 27 which is made rigid externally in at least one direction.

Figure 11:
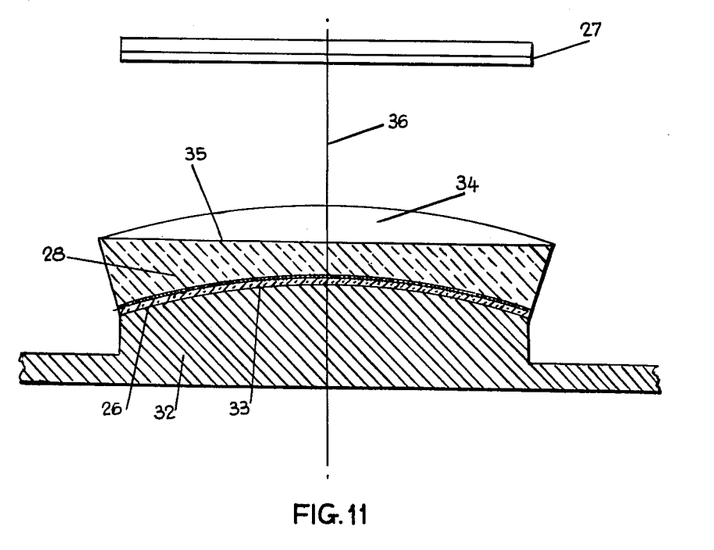
FIG. 11 is an intermediate stage in manufacture of the panels.
Figure 12:
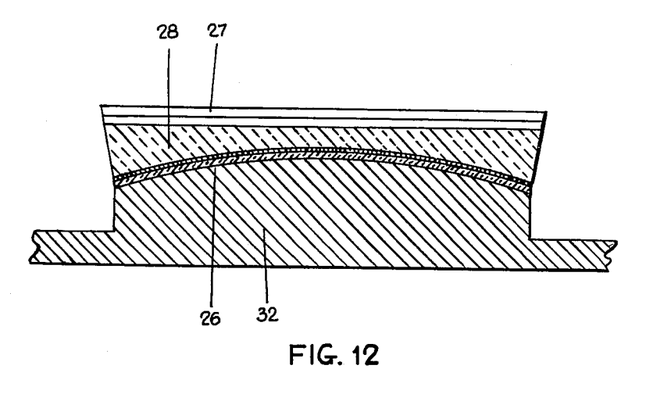
FIG. 12 is a view similar to FIG. 11 showning the panel provided with its final shaping whilst it is still over the mold or bed.

The mirror 26 with its reflecting surface directed towards the above said mold is arranged over the convex surface 33 of the mold or bed, as can be seen in FIG. 11. Since the radius of curvature of the convex surface 33 is very large and the thickness of mirror 26 is greatly reduced, this adapts itself due to its own weight, over practically the whole of its extension, to the convex surface 33. Should its periphery not adapt itself completely to the convex surface 33, slight pressure will be applied to the mirror which is sufficient to obtain its complete adaptation to the mold or bed 32 without in practice introducing stresses into the mirror. Then, above the convex external surface of mirror 26, the semi-rigid slab 28 is placed which, as was the case with mirror 26, adaptes itself due to its own weight to the convex surface of the said mirror, and it may also be necessary to apply slight pressure at points close to its periphery in order to provide complete adaptation. The surface of the semi-rigid slab which is directed towards mirror 26 is covered with any suitable adhesive so as to provide for bonding of the said slab to the rear surface of the mirror.

The upper part of the semi-rigid slab 28, carrying reference numeral 34 in FIG. 11, is removed using any process whatsoever, until a plane surface 35 is obtained which is perpendicular to the axis of symmetry 36 of mirror 26, this plane surface being located at such a height that it is limited by the lateral faces of the semi-rigid slab 28. Once portion 34 of the semi-rigid slab has been removed, the rigidified sheet 27 is arranged over the plane surface 35, which is fixed to the above said plane surface using a corresponding adhesive.

Figure 13:
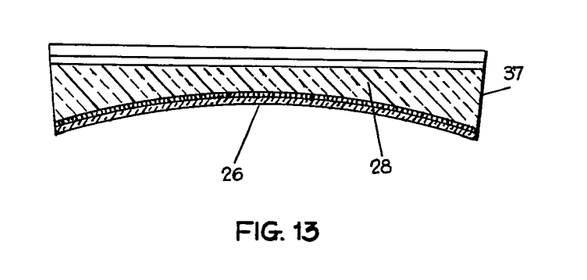
FIG. 13 is a cross-section of the panel obtained in accordance with the invention.

The rigidity of sheet 27 is such that when mold 32 is removed, the reflecting panels remain with the configuration shown in FIG. 13, in which the mirror 26 has the desired concave surface without in practice having introduced stressed in it.

The curved surface of semi-rigid slab 28 which is in contact with mirror 26 is a perfect surface, since it has not been obtained using machining, but rather from a plane surface using deformation of it over the convex surface to which it is obliged to adapt itself.

The lateral faces 37 of the panels can be sealed using a resin or by means of a strip which runs around the assembly preventing water or dust from entering the panel.

As can be seen in FIG. 9, which is a partial cross-section on an enlarged scale taken through lines IX—IX of FIG. 8, the sheet 27 may be provided with corrugations 29 which are directed, supposing the mirror to be cylindrical, in a sense which is perpendicular to the axis of it. These sheets have supports 30 attached to them so they may be attached to the supporting structure 10 of the heliostat.

As can be seen in FIG. 8, the edges of the panels can be sealed using a strip 31 which passes around the panels or using a sealing resin.

The reflecting panels according to the invention have the advantage that while providing the reflecting surface with the precise curvature needed to obtain the maximum concentration of reflected solar radiation, the curvature of the mirror is obtained without introducing practically any stresses into it at all and the surface of the slab or intermediate material 28 which is contact with mirror 26 does not have irregularities which could deform the curvature of the mirror.

Having described the invention it is thought to be novel and consequently, the content of the following clauses is claimed:

1. Apparatus for reflecting light comprising:
a support column; a revolving head in a horizontal plane, which is mounted above the said column; and a structure which carries reflecting panels, mounted in its turn above the said head and provided with means for rotation about a horizontal axis, between a position for following the sun and an inverted position which is approximately horizontal; an operating mechanism for the structure carrying the panels having one single mechanical linear actuator, said actuator having a casing suspended in an articulated manner on the revolving head, and an extendable element of the actuator connected at its free end to the vertex of an articulated quadrilateral, said quadrilateral having sides of constant length, one of the sides being defined by the revolving head itself, the adjacent sides being defined by an upper lever, which carries the structure for the mirrors, and a lower lever disposed to pass between said head and the vertex to which the actuator is articulated, the fourth side comprising an arm disposed to pass between the said vertex and the free end of the upper lever, the maximum degree of extension of the actuator being such that from a limiting withdrawn position to a position of maximum extension, the said upper lever is able to rotate through at least 180° about the point of articulation with the revolving head; each reflecting panel including a concave mirror obtained without introducing substantial stresses therein; and a mirror support including a base comprising a rigidified sheet, and an intermediate filling of reduced weight to support the concave configuration of the mirror; said individual reflecting panels being arranged with respect to each other in such a way that the mirrors are tangential to a spherical or cylindrical surface having its axis parallel to the plane of rotation of the revolving head.

2. Apparatus as defined in claim 1, wherein the mechanical actuator consists of a spindle having two nuts mounted therein, said nuts being pre-tensioned with respect to each other; a tubular profiled member surrounding said spindle and constituting the displaceable element of the same, said profiled member being adapted to pivot at its external end on said vertex of the articulated parallelogram, said spindle and said tubular profiled member being housed in a casing, in which the said profiled member is adapted to slide with respect to said casing and said spindle is adapted to rotate with respect to said casing.

3. Apparatus as defined in claim 1, wherein the operating mechanism for the revolving head includes an adjustable torque limiter which is pre-set to a predetermined turning moment of the said head.

4. Apparatus as defined in claim 1, wherein the reflecting panels having a concave surface, are manufactured by forming a mold or bed which has a convex surface having a curvature which is equal to the concavity of the reflecting panels, disposing a plane mirror of reduced thickness over the convex surface, such that the reflecting surface of the mirror is directed towards the convex mold surface, bending the plane mirror to adapt its shape to the said convex mold surface substantially as a result of weight, at least over a major portion of the surface of said mirror, disposing a slab of semi-rigid material over said mirror such that the slab adapts itself over the major portion of its extension to the convex surface of the mirror and bonding the slab to said mirror; removing a portion of the slab disposed above a plane perpendicular to the normal central axis of symmetry of the convex surface of the mold, the plane being at such a height that a planar surface is obtained which is above the lateral faces of said slab; a bonding sheet which is rigidified in at least one direction onto said planar surface, said rigid sheet maintaining the concave shaping of the mirror, once said mirror has been withdrawn from the mold.

5. Apparatus as defined in claim 4, wherein the mold is cylindrical, said rigid sheet being rigidified in a direction which is normal to the axis of the said cylinder.

6. Apparatus as defined in claim 4, further including applying slight pressure to said mirror at points which are close to the periphery of the mirror, said pressure being sufficient to obtain total adaptation of the mirror to the surface of the mold, without introducing substantial stresses into said mirror.

7. Apparatus as defined in claim 4, further including applying a slight pressure to points close to the periphery of the slab of semi-rigid material, said pressure being sufficient to obtain complete adaptation of said semi-rigid material to the convex surface of the mirror, without introducing substantial stresses into the said slab.

8. Apparatus as defined in claim 1, wherein said mirror is cylindrical, said mirror disposed such that an axis to which the said mirrors are tangential, is normal to the axis of said cylindrical mirror, and wherein said rigidified sheet is disposed perpendicularly to the axis of the cylinder defined by the mirror.

9. Apparatus as defined in claim 1, wherein said operating mechanism for the actuator includes an adjustable torque limiter, set to a predetermined turning moment of the panels carrying said mirrors.

* * * * *